(12) United States Patent
Nagasawa et al.

(10) Patent No.: US 8,320,976 B2
(45) Date of Patent: Nov. 27, 2012

(54) APPARATUS AND COMMUNICATIONS SYSTEM FOR EXTENDING LIFE OF A BATTERY FOR A MOBILE TERMINAL

(75) Inventors: Hideyuki Nagasawa, Yokohama (JP); Yusuke Saito, Kawasaki (JP); Kohei Sato, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 171 days.

(21) Appl. No.: 12/464,319

(22) Filed: May 12, 2009

(65) Prior Publication Data
US 2009/0286578 A1 Nov. 19, 2009

(30) Foreign Application Priority Data
May 13, 2008 (JP) .................................. 2008-125940

(51) Int. Cl.
*H04M 1/00* (2006.01)
(52) U.S. Cl. .................. 455/574; 455/414.1; 455/127.4; 455/434
(58) Field of Classification Search .................... 455/574
See application file for complete search history.

(56) References Cited

U.S. PATENT DOCUMENTS

| 6,721,580 B1* | 4/2004 | Moon ............................ 455/574 |
| 7,610,495 B2* | 10/2009 | Azadet et al. ................. 713/300 |
| 2005/0093512 A1* | 5/2005 | Mader et al. ................. 320/116 |
| 2005/0239443 A1* | 10/2005 | Watanabe et al. .......... 455/414.1 |
| 2006/0223465 A1* | 10/2006 | Akiba et al. ................. 455/127.4 |
| 2007/0275717 A1* | 11/2007 | Edge et al. ...................... 455/434 |
| 2008/0311961 A1* | 12/2008 | Cotevino et al. .............. 455/574 |

FOREIGN PATENT DOCUMENTS

| EP | 0896493 | 10/1999 |
| EP | 1708369 | 4/2006 |
| GB | 2403870 | 12/2005 |
| JP | 2001-095061 A | 4/2001 |
| WO | 2005006722 | 1/2005 |
| WO | 2007/080627 A1 | 7/2007 |

OTHER PUBLICATIONS

European Office Action for EP09159987.8-2414, dated May 2, 2011.
Office Action with English Translation; Dated Apr. 17, 2012, issued in conjunction with Japanese Patent Application No. 2008-125940.
Extended European Search Report for EP09159987.8-2414, dated Oct. 12, 2009.

* cited by examiner

*Primary Examiner* — Charles Shedrick
(74) *Attorney, Agent, or Firm* — Michaud-Kinney Group LLP

(57) ABSTRACT

To provide a mobile terminal apparatus capable of suppressing exhaustion of the battery while securing convenience of switching to a communication system corresponding to an existing area, and a control method and communication system for the apparatus, a mobile terminal apparatus 20 is driven by power supply from a battery, capable of communicating with each of a plurality of communication systems, monitors a communication environment with each of the communication systems, and has a detecting section that detects a battery remaining amount of the battery, and a control section 21 that limits targets to monitor when the battery remaining amount falls below a first threshold.

9 Claims, 7 Drawing Sheets

| OPERATOR NAME | AREA DEVELOPMENT INFORMATION | DETAILS OF CONTROL |
|---|---|---|
| AAA | 3G:100%<br>GSM:100% | FIX 3G |
| BBB | 3G:50%<br>GSM:90% | 3G/GSM AUTOMATIC SWITCHING WHEN THE BATTERY REMAINING AMOUNT IS 3<br>FIX GSM WHEN THE BATTERY REMAINING AMOUNT IS 2 OR LESS |
| CCC | 3G:95%<br>GSM:50% | 3G/GSM AUTOMATIC SWITCHING WHEN THE BATTERY REMAINING AMOUNT IS 3<br>FIX 3G WHEN THE BATTERY REMAINING AMOUNT IS 2 OR LESS |
| DDD | 3G:0%<br>GSM:100% | FIX GSM |
| ⋮ | ⋮ | ⋮ |

| OPERATOR NAME | AREA DEVELOPMENT INFORMATION | DETAILS OF CONTROL |
|---|---|---|
| AAA | 3G:100%<br>GSM:100% | FIX 3G |
| BBB | 3G:50%<br>GSM:90% | 3G/GSM AUTOMATIC SWITCHING WHEN THE BATTERY REMAINING AMOUNT IS 3<br>FIX GSM WHEN THE BATTERY REMAINING AMOUNT IS 2 OR LESS |
| CCC | 3G:95%<br>GSM:50% | 3G/GSM AUTOMATIC SWITCHING WHEN THE BATTERY REMAINING AMOUNT IS 3<br>FIX 3G WHEN THE BATTERY REMAINING AMOUNT IS 2 OR LESS |
| DDD | 3G:0%<br>GSM:100% | FIX GSM |
| ... | ... | ... |

FIG. 6

APPARATUS AND COMMUNICATIONS SYSTEM FOR EXTENDING LIFE OF A BATTERY FOR A MOBILE TERMINAL

CROSS-REFERENCE TO RELATED APPLICATION

The present disclosure relates to subject matter contained in Japanese Patent Application No. 2008-125940 filed on May 13, 2008, which are expressly incorporated herein by reference in its entireties.

BACKGROUND OF THE INVENTION

1. Field of the Invention

The present invention relates to a mobile terminal apparatus, and a control method and communication system for the apparatus, and more particularly, to a mobile terminal apparatus having the function of switching between communication systems intended for communication, and a control method and communication system for the apparatus.

2. Description of Related Art

Conventionally, as communication systems of cellular telephone apparatuses, for example, there have been various systems such as the W-CDMA system, GSM (Global System for Mobile Communications) system and the like, and systems have been considered that enable a cellular telephone apparatus to perform communication with some communication system to be usable in a communication area of a communication system using another communication system differing from the some communication system (see Patent Document 1). In this system, when a cellular telephone apparatus for performing communication with a communication system moves to a communication area of a communication system using some communication system differing from the communication system of the apparatus, the communication system is switched to the system adapted to the cellular telephone apparatus for the cellular telephone apparatus to communicate.

In this way, it is considered to be able to extend the available area of a cellular telephone apparatus for performing communication using only a single communication system.

Meanwhile, another method is also considered that communication systems are switched on the cellular telephone apparatus side corresponding to a communication system of a communication area (hereinafter, referred to as an existing area) where the cellular telephone apparatus exists. In this case, without a change on the communication system side that is a communication target of the cellular telephone apparatus, only by switching between communication systems on the cellular telephone apparatus side, it is possible to support various communication systems (communication systems) to perform communication.

However, in the method in which a cellular telephone apparatus switches between communication systems according to the existing area, the cellular telephone apparatus needs to detect a communicable communication system of the communication system in the existing area. In this case, the cellular telephone apparatus needs to periodically transmit and receive signals to monitor a communicable communication system in the existing area with a plurality of communication systems, and a problem arises that power consumption increases and becomes a cause of accelerating exhaustion of the battery, as compared with the case of periodically issuing signals to monitor the communication environment with a single communication system.

SUMMARY OF THE INVENTION

The present invention was carried out in view of the respects, and it is an object of the invention to provide a mobile terminal apparatus capable of suppressing exhaustion of the battery while securing convenience of switching to a communication system corresponding to an existing area, and a control method and communication system for the apparatus.

A mobile terminal apparatus of the invention is a mobile terminal apparatus which is driven by power supply from a battery, capable of communicating with each of a plurality of communication systems, and performs monitoring of a communication environment with each of the communication systems, and has detecting means for detecting a battery remaining amount of the battery, and control means for limiting targets for the monitoring when the battery remaining amount falls below a first threshold.

According to this constitution, when the battery remaining amount of the battery is sufficiently left, it is possible to secure convenience of switching between communication systems intended for communication by monitoring the communication environment with each of the communication systems, and when the battery remaining amount becomes low, by limiting the monitoring targets, it is possible to suppress exhaustion of the battery corresponding to the limitation.

Further, in the invention, it is preferable in the above-mentioned mobile terminal apparatus that the control means limits the targets for the monitoring to any one of the plurality of communication systems when the battery remaining amount falls below the first threshold. In this case, since the monitoring targets are limited to one, it is possible to further suppress exhaustion of the battery.

Furthermore, in the invention, it is preferable in the above-mentioned mobile terminal apparatus that the control means acquires information about communicable communication systems corresponding to an existing area of the mobile terminal apparatus, and based on the acquired information, selects a target for monitoring when the battery remaining amount falls below the first threshold. In this case, by selecting communicable monitoring targets corresponding to the existing area, it is possible to decrease the probability that selected monitoring targets are not originally communicable.

Still furthermore, in the invention, it is preferable in the above-mentioned mobile terminal apparatus that the control means acquires the information about communicable communication systems corresponding to the existing area by communication with at least one of the plurality of communication systems. In this case, the communication system delivers the information about communicable communication systems held in the communication system to the mobile terminal apparatus, and the mobile terminal apparatus limits the monitoring targets based on the acquired information, and is thereby capable of acquiring the information about communicable communication systems in the existing area.

Moreover, in the invention, it is preferable in the above-mentioned mobile terminal apparatus that the control means accumulates monitoring results of communication environments with the plurality of communication systems, and uses accumulated results as the information about communicable communication systems corresponding to the existing area. In this case, when the mobile terminal apparatus moves, the information about communicable communication systems and the position (existing area) is accumulated as the moving, and it is thereby possible to select a communication system adapted to a trend of the moving path of the user of the mobile terminal apparatus.

Further, in the invention, it is preferable in the above-mentioned mobile terminal apparatus that the control means controls the power of the mobile terminal apparatus to be off when the battery remaining amount of the battery falls bellow a second threshold lower than the first threshold. In this case, when the battery remaining amount falls below the second threshold after falling below the first threshold and the monitoring targets being thereby limited, since the power is controlled to be off, it is possible to maintain the state enabling communication to be performed for a required minimum time in an emergency and the like.

Furthermore, in the invention, it is preferable in the above-mentioned mobile terminal apparatus that the control means limits usable functions of the mobile terminal apparatus when the battery remaining amount of the battery falls bellow the first threshold or a second threshold lower than the first threshold. In this case, when the monitoring targets are limited to suppress exhaustion of the battery, by limiting the operable functions, it is possible to further enhance the effect.

A control method of a mobile terminal apparatus of the invention is a control method of a mobile terminal apparatus which is driven by power supply from a battery, capable of communicating with each of a plurality of communication systems, and performs monitoring of a communication environment with each of the communication systems, and has the steps of detecting a battery remaining amount of the battery, and limiting targets for the monitoring when the battery remaining amount falls below a first threshold.

According to this method, when the battery remaining amount of the battery is sufficiently left, it is possible to secure convenience of switching between communication systems intended for communication by monitoring the communication environment with each of the communication systems, and when the battery remaining amount becomes low, by limiting the monitoring targets, it is possible to suppress exhaustion of the battery corresponding to the limitation.

A communication system of the invention is a communication system having a mobile communication center for communicating with a mobile terminal apparatus, where the mobile communication center has transmitting/receiving means for transmitting and receiving signals to respond to monitoring of a communication environment performed by the mobile terminal apparatus, and the mobile terminal apparatus has communication means capable of communicating by a plurality of communication systems, transmitting/receiving means for performing monitoring of the communication environment by each of the communication systems with the mobile communication center in a communication standby status, a battery as a driving power supply, detecting means for detecting a battery remaining amount of the battery, and limiting means for limiting targets for the monitoring when the battery remaining amount falls below a threshold.

According to this constitution, when the battery remaining amount of the battery is sufficiently left, it is possible to secure convenience of switching between communication systems intended for communication by monitoring the communication environment with each of the communication systems, and when the battery remaining amount becomes low, by limiting the monitoring targets, it is possible to suppress exhaustion of the battery corresponding to the limitation.

According to the invention, it is possible to provide a mobile terminal apparatus capable of suppressing exhaustion of the battery while securing convenience of switching to a communication system corresponding to an existing area, and a control method and communication system for the apparatus.

BRIEF DESCRIPTION OF THE DRAWINGS

FIG. 6 is a diagram showing area development information;

DETAILED DESCRIPTION OF THE PREFERRED EMBODIMENTS

Embodiments of the present invention will specifically be described below with reference to accompanying drawings.

Figure 1:
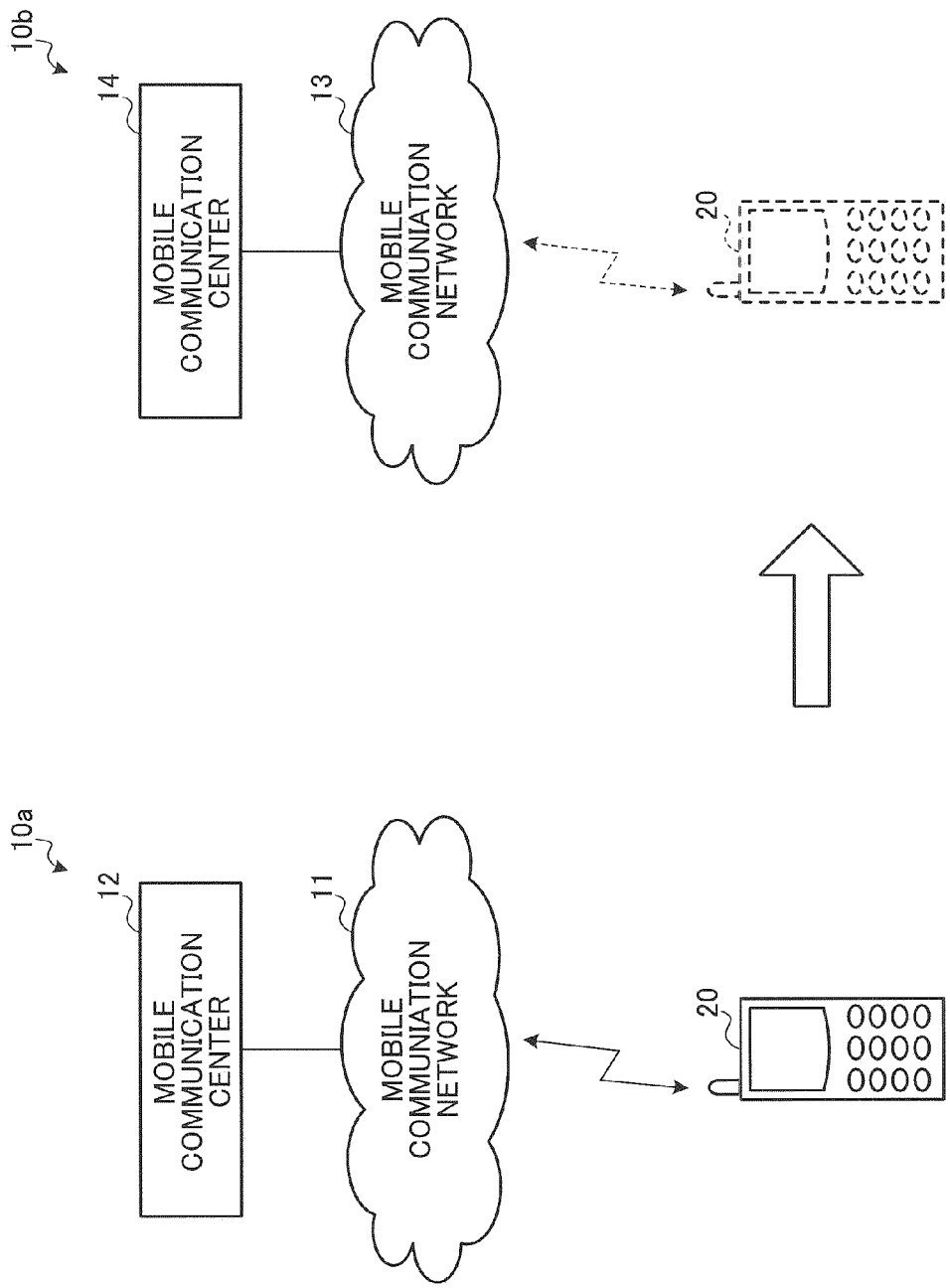
FIG. 1 is a diagram showing a schematic configuration of a communication system according to Embodiment 1 of the invention.

FIG. 1 is a schematic configuration diagram showing a plurality of communication systems, 10a and 10b, as environments using a cellular telephone apparatus 20 as a mobile terminal apparatus according to Embodiment 1 of the invention. As shown in FIG. 1, a mobile communication network 11 and mobile communication center 12 constituting the first communication system 10a are of a communication environment for performing communication using a W-CDMA system (first communication system), for example, and in contrast thereto, a mobile communication network 13 and mobile communication center 14 constituting the second communication system 10b are of a communication environment for performing communication using a GSM system (second communication system), for example.

The cellular telephone apparatus 20 performs communication by the W-CDMA system in a communication area of the first communication system 10a, and is thereby capable of communicating with the mobile communication center 12 via the mobile communication network 11. The apparatus 20 is thus capable of performing communication such as a call and the like with another cellular telephone apparatus connected to the mobile communication center 12.

Further, the cellular telephone apparatus 20 performs communication by the GSM system in a communication area of the second communication system 10b, and is thereby capable of communicating with the mobile communication center 14 via the mobile communication network 13. The apparatus 20 is thus capable of performing communication such as a call and the like with another cellular telephone apparatus connected to the mobile communication center 14.

Figure 2:
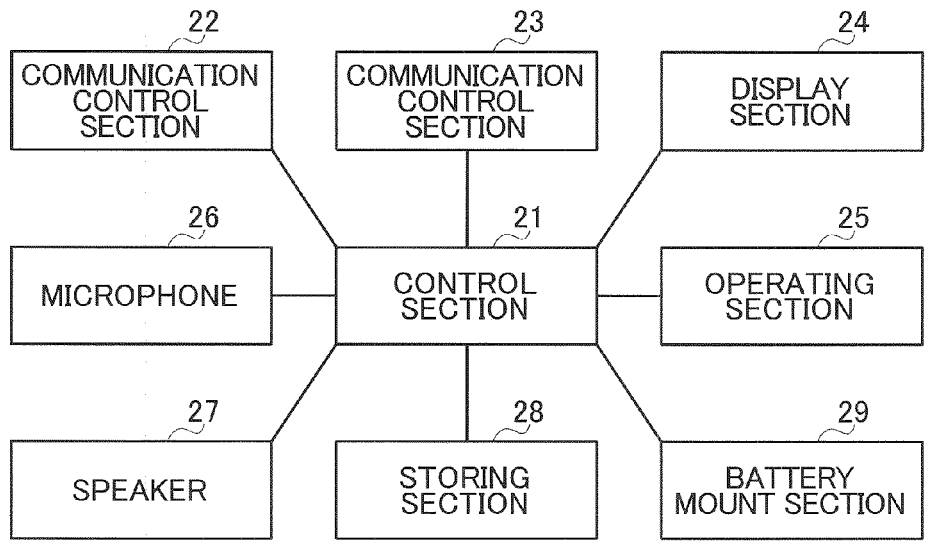
FIG. 2 is a block diagram illustrating a configuration of a cellular telephone apparatus in the communication system of FIG. 1.

FIG. 2 is a block diagram showing a schematic configuration of the cellular telephone apparatus 20. In addition, the configuration as shown in FIG. 2 is simplified to explain the invention, and assumed to have components installed in an ordinary cellular telephone apparatus.

The cellular telephone apparatus 20 is mainly comprised of a control section 21 that controls the entire apparatus, first communication control section 22 to perform communication by the W-CDMA system, second communication control section 23 to perform communication by the GSM communication system, display section 24 that displays various kinds of data, operating section 25 that performs various operations, microphone 26 to input a sound, speaker 27 to output a sound, storing section 28 that stores various kinds of data, and battery mount section 29 mounted with a battery to perform power supply to the cellular telephone apparatus 20 from the battery.

The first communication control section 22 receives a signal issued periodically from an access point by the first communication system (first communication system), and based on information included in the signal, always monitors information of the access point being currently connected and the radio-signal intensity of the received signal. Then, when it is judged that the connection with the access point under communication becomes worse, the section 22 switches to another access point, or another communication system.

Meanwhile, the second communication control section 23 receives a signal issued periodically from an access point by the second communication system (second communication system), and based on information included in the signal, always monitors information of the access point being currently connected and the radio-signal intensity of the received signal. Then, when it is judged that the connection with the access point under communication becomes worse, the section 23 switches to another access point, or another communication system.

The control section 21 always detects monitoring results by the communication control sections 22 and 23, and based on the monitoring results, when a connectable state is detected by either the communication control section 22 or 23, determines that the communication system by the communication control section is a connectable communication system in the existing area. Based on the determination result, the cellular telephone apparatus 20 is capable of performing communication with the automatically switched communication system in accordance with the communication system of the existing area.

Further, the control section 21 monitors the remaining amount of the battery mounted on the battery mount section 29, and executes various kinds of processing (described later) corresponding to the battery remaining amount.

Figure 3:
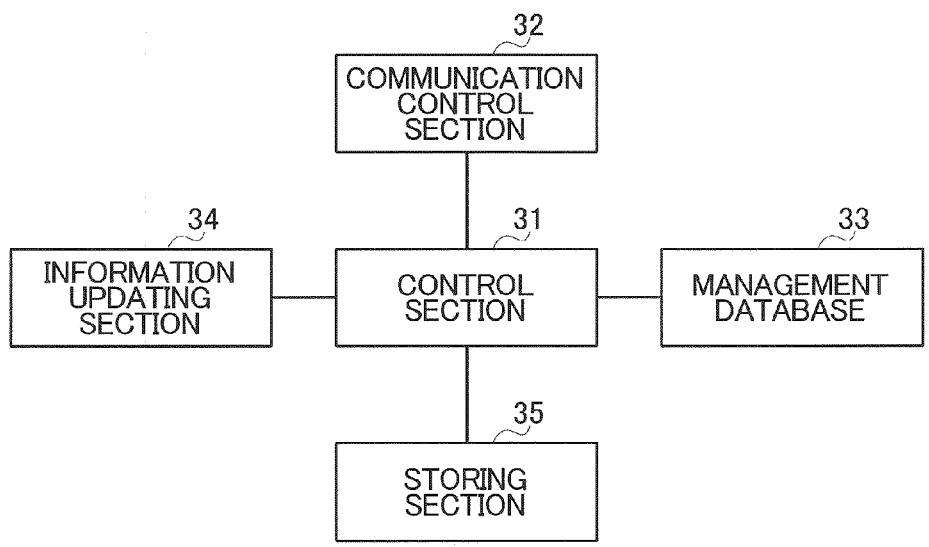
FIG. 3 is a block diagram illustrating a configuration of a mobile communication center in the communication system of FIG. 1.

FIG. 3 is a block diagram illustrating a configuration of the mobile communication center 12. In addition, the mobile communication center 14 is assumed to have the same configuration as that of the mobile communication center 12 and differ in only the communication system. It is further assumed that the configuration as shown in FIG. 3 is simplified to explain the invention, and has components installed in an ordinary mobile communication center.

As shown in FIG. 3, the mobile communication center 12 is mainly comprised of a control section 31 that controls the entire apparatus, communication control section 32 that performs communication with the mobile terminal apparatus 20 by mobile communications via the mobile communication network 11, management database (DB) 33 that manages provision destinations of communication service, information updating section 34 that updates information of the management database 33, and storing section 35 that stores information about communication systems to provide to the mobile terminal apparatus 20.

Figure 4:
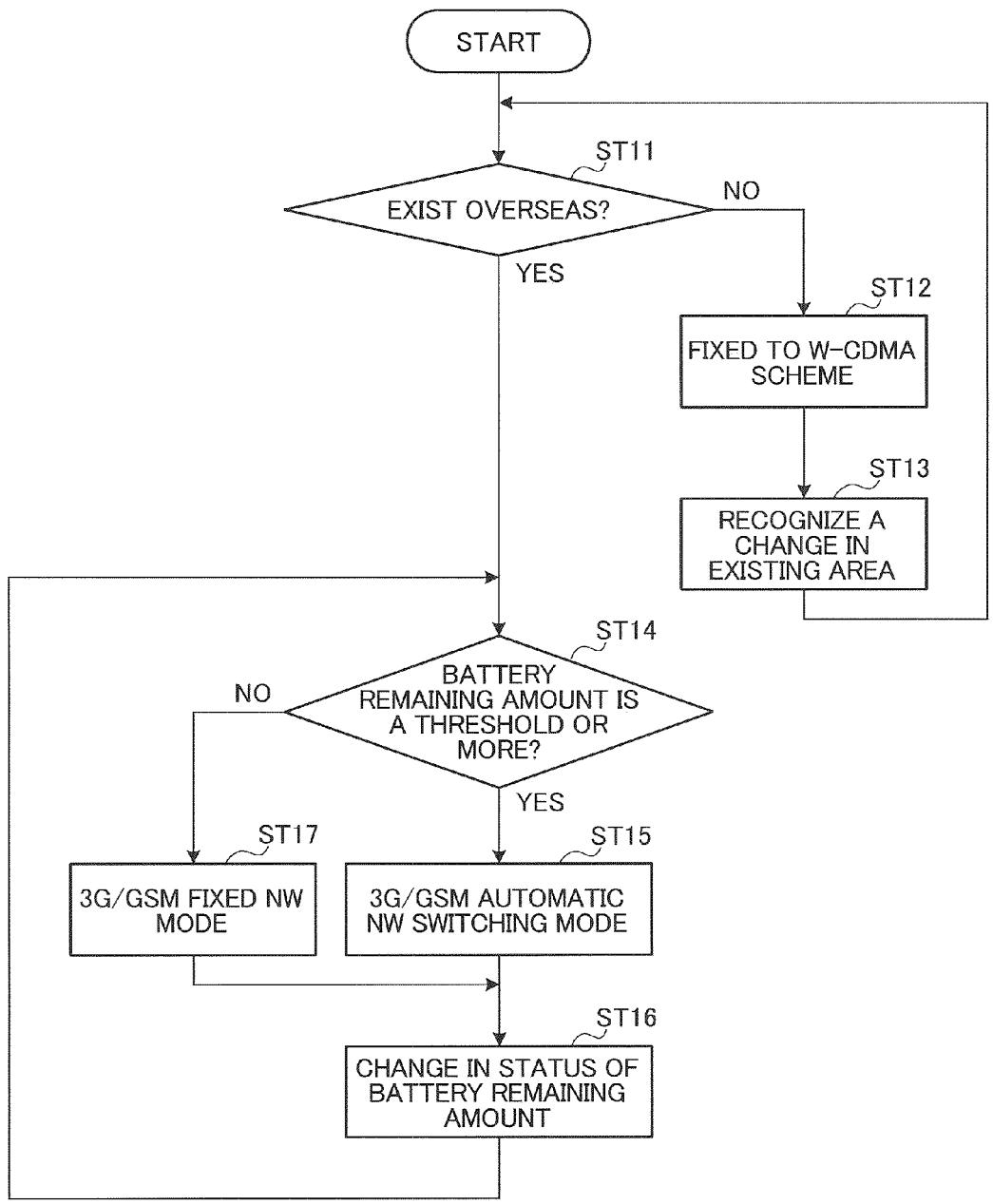
FIG. 4 is a flowchart showing a processing procedure of processing for switching between communication systems by a control section of the cellular telephone apparatus.

FIG. 4 is a flowchart showing a processing procedure of processing for switching between communication systems by the control section 21 of the cellular telephone apparatus 20. As shown in FIG. 4, when the power of the cellular telephone apparatus 20 is turned on, the control section 21 of the cellular telephone apparatus 20 moves into the processing procedure, and in step ST11, determines whether or not the existing area is an overseas area. As the determination method, it is possible to use various methods such as, for example, a method of determining a country name of the existing area based on information included in a signal transmitted and received periodically to/from an access point, another method of making a determination by acquiring positional information using GPS, and the like.

Then, in this step ST11, when the existing area is determined to be an area in this country (Japan), the control section 21 proceeds to step ST12 from step ST11, determines a communication system used in the country (Japan) from a correspondence table of the storing section 28, selects the first communication control section 22 for performing communication by this communication system (for example, communication system by W-CDMA system), and performs communication such as periodical transmission and reception of signal to/from the access point, call and the like by the selected communication system.

Then, when a change in communication conditions (a change in reception sensitivity, communication failure or the like) is noticed in the first communication control section 22 selected at this point, the control section 21 recognizes in step ST13 that a change occurs in the existing area, returns to above-mentioned step ST11 from step ST13, and makes a determination again on the exiting area.

In this step ST11, when it is determined that the exiting area is overseas (except Japan), the control section 21 shifts to step ST14 from step ST11, checks the battery remaining amount of the battery mounted on the battery mount section 29, and determines whether or not the battery remaining amount is a beforehand set threshold (first threshold) or more. In addition, as the threshold, it is possible to use a voltage value of the battery, or remaining-amount level determined based on the voltage value (for example, assuming that the fully charged state is level 3, the intermediate battery remaining amount is level 2, and that the decreased battery remaining amount is level 1.) The threshold is stored in the storing section 28, and read by the control section 21 when necessary.

When determining that the check result of the battery remaining amount is the threshold or more, the control section 21 proceeds to step ST15 from step ST14 to continue monitoring of the existing area by both of the first communication control section 22 and the second communication control section 23, and executes an automatic network (NW) switching mode for selecting a communication system (the first communication control section 22 or the second communication control section 23) of the area determined to be the existing area. In addition, in this Embodiment, since it is assumed that the communication system by the first communication control section 22 is W-CDMA that is the 3rd generation communication system (3G), and that the communication system by the second communication control section 23 is the GSM system that is the 2nd generation communication system, automatic switching between 3G and GSM is performed in the automatic network switching mode. In addition, the communication systems (i.e. the communication system of the first communication control section 22 and the communication system of the second communication control section 23) switched by the switching mode are not limited thereto, and it is also possible to apply other communication systems as a substitute for the communication systems, or apply another communication system in addition to the systems.

Then, when a change occurs in status of the battery remaining amount of the battery (when the battery voltage value changes, the remaining-amount level changes or the like) in step ST16, the control section 21 returns to above-mentioned step ST14 from step ST16, and checks again the battery remaining amount.

When it is determined that a result of checking the battery remaining amount in step ST14 is less than the threshold, the control section 21 proceeds to step ST17 from step ST14, and fixes either the first communication control section 22 or the second communication control section 23 to perform monitoring (3G/GSM fixed network (NW) mode). By this means, when the battery remaining amount of the battery is low, only the first or second communication control section 22 or 23 performs monitoring, the operation of periodically transmitting and receiving signals to/from the access point is performed only by the first or second communication control section 22 or 23, and it is thereby possible to suppress subsequent reductions in the battery remaining amount. In other words, when the battery remaining amount of the battery is the threshold or more, all the plurality of communication systems (first communication section 22 and second communication section 23) are made operable, and it is possible to perform area monitoring with the plurality of communication systems. Meanwhile, when the battery remaining amount is less than the threshold, operable communication control sections are limited, and it is thereby possible to suppress reductions in the battery remaining amount.

Particularly, when the battery remaining amount decreases, it is necessary to extend the usable remaining time as long as possible by reducing power consumption of the cellular telephone apparatus 20 as much as possible until measures such as charging or the like are taken, and in such a case, by limiting the number of communication systems (communication control sections) to perform area monitoring to the low number (one in this Embodiment), it is possible to reduce power consumption corresponding to the limitation, and to avoid the usable time from being shortened. Then, as a result of monitoring the limited (fixed) monitoring target, when the control section 21 obtains a result that the communication environment with the monitoring target allows communication, the section 21 controls to perform communication with the communication system that is the monitoring target. In other words, monitoring is continued on the communication system that is the monitoring target. In contrast thereto, when it is determined that the communication environment with the communication system does not allow communication, the section 21 displays the result in the display section 24, and for example, displays descriptions for urging the user to change the monitoring target to another communication system. By this means, the user performs a predetermined operation, and is able to manually switch the monitoring target to another communication system.

Above-mentioned Embodiment 1 describes the case where either of the communication systems (first or second communication control section 22 or 23) is fixed to perform communication when the battery remaining amount is less than the threshold, and this Embodiment differs from Embodiment 1 in the respect that the cellular telephone apparatus 20 acquires information about the communication system communicable in the existing area from a server or the like, and based on the information, selects a communication system to fix.

Figure 5:
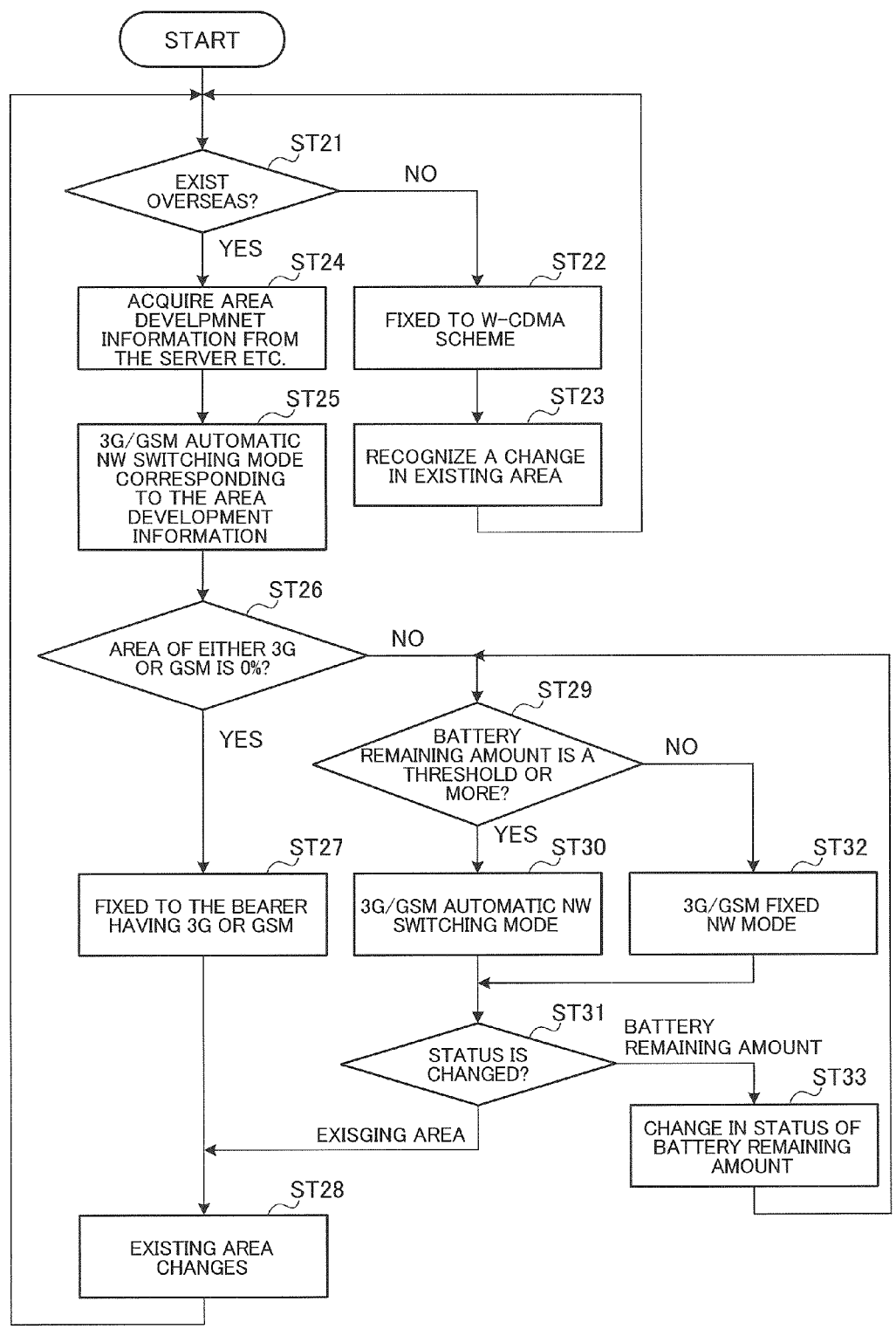
FIG. 5 is a flowchart showing a processing procedure of processing for switching between communication systems of a cellular telephone apparatus according to Embodiment 2.

In other words, FIG. 5 is a flowchart showing a processing procedure of processing for switching between communication systems of the cellular telephone apparatus 20 according to this Embodiment, and when the power of is turned on, the control section 21 moves into the processing procedure, and in step ST21, determines whether or not the existing area is an overseas area. As the determination method, for example, it is possible to use a method of determining whether or not it is possible to perform communication with the existing area (telecommunications carrier) (i.e. determining whether or not the communication destination is a telecommunications carrier under contract) based on the information transmitted and received periodically to/from an access point, and thereby determining a country name of the existing area.

Then, in this step ST21, when the existing area is determined to be an area in this country (Japan), the control section 21 proceeds to step ST22 from step ST21, determines a communication system used in the country (Japan) from a correspondence table of the storing section 28, selects the first communication control section 22 for performing communication by this communication system (for example, communication system by W-CDMA system), and performs communication such as periodical transmission and reception of signal to/from the access point, call and the like by the selected communication system.

Then, when a change in communication conditions (a change in reception sensitivity, communication failure or the like) is noticed in the first communication control section 22 selected at this point, the control section 21 recognizes that a change occurs in the existing area in step ST23, returns to above-mentioned step ST21 from step ST23, and makes a determination again on the exiting area.

In this step ST21, when it is determined that the exiting area is overseas (except Japan), the control section 21 shifts to step ST24 from step ST21, and acquires area development information from the mobile communication centers 12, 14, or from servers or the like via the mobile communication centers 12, 14. In addition, as the acquisition method, for example, it is possible to use a method of acquiring the information by communication with the mobile communication center in a communication standby state or the like. The area development information is assumed to be stored in the storing sections 35 of the mobile communication centers 12, 14, other servers or the like. As shown in FIG. 6, the area development information is information indicating rates of communication systems in a communication area developed by each telecommunications carrier, and as an example shown in FIG. 6, in a telecommunications carrier "AAA", the 3G system has the development rate of 100%, while the GSM system has also the development rate of 100%. Further, in a telecommunications carrier "BBB", the 3G system has the development rate of 50%, while the GSM system has the development rate of 90%. Thus, the telecommunications carrier name and rate (development rate) of development of each communication system are paired and registered with the server or the like, and the control section 21 of the cellular telephone apparatus 20 acquires the information about the development rate of the telecommunication carrier with which the cellular telephone apparatus 20 has a contract from the server, and is thereby capable of determining a communication system to select and fix (described later). In addition, when the development rates of telecommunications carriers are not collectively stored in the server or the like, the cellular telephone apparatus 20 acquires only the development rate of the telecommunications carrier under the contract from the server of the telecommunications server, or the mobile communication centers 12, 14.

In this regard, substituting for the fact that the server or the like holds the area development information to provide to the cellular telephone apparatus 20, for example, when the cellular telephone apparatus 20 monitors whether or not the existing area is a communicable area, the cellular telephone apparatus 20 may accumulate the communication system name determined to be communicable in the storing section 28 of the apparatus 20, and obtain the correspondence between the number of accumulation times and the communication system name for each area (telecommunications carrier) in which the cellular telephone apparatus 20 has existed. In this case, the number of accumulation times indicates the development rate of the telecommunications carrier in the moving range of the cellular telephone apparatus 20. In other words, the area development information corresponding to the moving history of the cellular telephone apparatus 20 is accumulated in the storing section 28 of the cellular telephone apparatus 20, and selection is made to select a communication system adapted to the trend of the moving path of the user of the cellular telephone apparatus 20.

The control section 21 acquiring the area development information in step ST24 proceeds to step ST25, and executes an automatic network (NW) switching mode for communication systems (3G/GSM) corresponding to the area information. In other words, in the switching mode, the control section 21 proceeds to step ST26, and selects a communication system with the higher development rate based on the development rate of the 3G system and the development rate of the GSM system in the exiting area based on the acquired area development information (when the development rates are the same, the 3G system is selected). For example, when it is determined that the existing area of the cellular telephone apparatus 20 is an area of the telecommunications carrier "AAA" under the contract by periodical communication with the access point, the control section 21 selects the communicable communication system (3G system (FIG. 6)) based on the development rate of each communication system of the telecommunications carrier "AAA" in the existing area obtained from the server.

In addition, in the example as shown in FIG. 6, in the telecommunications carrier "AAA", since the 3G system has the development rate of 100% and the GSM system has the development rate of 100%, in this case is selected the 3G system with the higher spectral efficiency (described later). Meanwhile, in the telecommunications carrier "BBB", since the 3G system has the development rate of 50% and the GSM system has the development rate of 90%, in this case is selected the GSM system with the higher development rate. By this means, the probability increases of selecting the communication system in accordance with the communication system of the existing area. Further, in the telecommunications carrier "CCC", since the 3G system has the development rate of 95% and the GSM system has the development rate of 50%, in this case is selected the 3G system with the higher development rate. By this means, the probability increases of selecting the communication system in accordance with the communication system of the existing area. Moreover, in the telecommunications carrier "DDD", since the 3G system has the development rate of 0% and the GSM system has the development rate of 100%, in this case is selected the GSM system with the higher development rate. By this means, the probability increases of selecting the communication system in accordance with the communication system of the existing area.

The control section 21 proceeds to step ST26, and based on the development rate of each communication system acquired from the server, determines whether or not the development rate of either the 3G system or GSM system is 0%. For example, in the development rates as shown in FIG. 6, since the development rate of the 3G system is 0% in the telecommunications carrier "DDD", in the case that the telecommunications carrier "DDD" is selected as the contracted telecommunications carrier, the control section 21 proceeds to step ST27 by obtaining a positive result in step ST26. In step ST27, the control section 21 selects a system of which the development rate is not 0% from the 3G system and GSM system, and fixes the bearer (communication control section 22 or 23). Then, in step ST28, when a change occurs in the existing area, the control section 21 returns to above-mentioned step ST21, and determines whether or not the existing area is overseas.

In contrast thereto, when both of the 3G system and the GSM systems are not of the development rate of 0% in step ST26, the control section 21 proceeds to step ST29 from step ST26, checks the battery remaining amount of the battery mounted on the battery mount section 29, and determines whether or not the battery remaining amount is a beforehand set threshold (first threshold) or more. In addition, as the threshold, it is possible to use a voltage value of the battery, or remaining-amount level determined based on the voltage value (for example, assuming that the fully charged state is level 3, the intermediate battery remaining amount is level 2, and that the decreased battery remaining amount is level 1.) In the threshold and selection method, for example, details of control as shown in FIG. 6 are referred to. These pieces of information are stored in the storing section 28 when the information is acquired from the server, and read by the control section 21 when necessary.

When determining that the check result of the battery remaining amount is the threshold or more, the control section 21 proceeds to step ST30 from step ST29 to continue monitoring of the existing area by both of the first communication control section 22 and the second communication control section 23, and executes the automatic network (NW) switching mode for selecting a communication system (the first communication control section 22 or the second communication control section 23) of the area determined to be the existing area. In addition, in this Embodiment, since it is assumed that the communication system of the first communication control section 22 is W-CDMA that is the 3rd generation communication system (3G), and that the communication system of the second communication control section 23 is the GSM system that is the 2nd generation communication system, automatic switching between 3G and GSM is performed in the automatic network switching mode. In this regard, the communication systems (i.e. the communication system of the first communication control section 22 and the communication system of the second communication control section 23) switched by the switching mode are not limited thereto, and it is also possible to apply other communication systems as a substitute for the communication systems, or apply another communication system in addition to the systems.

Then, the control section 21 proceeds to step ST31, and determines whether or not a change occurs in status such as a change in the battery remaining amount, a change in the existing area as the cellular telephone apparatus 20 moves, or the like.

Meanwhile, when it is determined that a result of checking the battery remaining amount in step ST29 is less than the threshold, the control section 21 proceeds to step ST32 from step ST29, and fixes either the first communication control section 22 or the second communication control section 23 to perform monitoring (3G/GSM fixed network (NW) mode). In this step ST32, the control section 21 selects a communication system with the higher development rate (the 3G system when the development rates are the same) based on the development rate of each communication system already acquired from the server in above-mentioned step ST24. By this means, when the battery remaining amount of the battery is low, only the first or second communication control section 22 or 23 performs communication, the operation of periodically transmitting and receiving signals to/from the access point is performed only by the first or second communication control section 22 or 23, and it is possible to suppress subsequent reductions in the battery remaining amount. Further, in this case, by fixing the communication system with the higher development rate, the probability becomes high that the communication system with excellent communication conditions is fixed.

Then, the control section 21 proceeds to step ST31, and determines whether or not a change occurs in status such as a change in the battery remaining amount, a change in the existing area as the cellular telephone apparatus 20 moves, or the like.

When it is determined that a change occurs in the battery remaining amount in step ST31, the control section 21 proceeds to step ST33 from step ST31, and corresponding to the change in status of the battery remaining amount (the case that the battery voltage value changes, the case that the remaining-amount level changes, or the like), returns to above-mentioned step ST29 to check the battery remaining amount.

Meanwhile, when it is determined that a change occurs in the existing area in step ST31, the control section 21 proceeds to above-mentioned step ST28, and when the existing area is changed, returns to above-mentioned step ST21 to determine whether or not the existing area is overseas.

Thus, in this Embodiment, a communication system to fix is selected based on the development rate of the communication system in the existing area of the cellular telephone apparatus 20, and it is thereby possible to increase the probability of being fixed to the actually usable communication system. By this means, for example, when the cellular telephone apparatus 20 is moving overseas, the cellular telephone apparatus 20 acquires the development rate of each communication system of the contracted telecommunications carrier communicable in the moving area, while fixing the communication system to a communication method with the higher development rate when the battery remaining amount decreases. It is thereby possible to increase the probability that the communication environment is good in the fixed communication system.

Thus, according to the cellular telephone apparatus 20 of this Embodiment, when construction environments of networks vary according to the country in which the apparatus 20 exists, it is possible to select a communication system corresponding to the network construction status of the country by acquiring the network construction status (development rate) of the country.

In addition, the above-mentioned Embodiment describes the case of fixing a communication system to monitor in a standby state to suppress power consumption when the battery remaining amount is less than a threshold (first threshold), and in addition thereto, the power of the cellular telephone apparatus 20 may be automatically turned off to leave the minimum usable time (about ten minutes) of the battery when the battery remaining amount falls below about predetermined call permission time (for example, ten minutes) (second threshold). In this case, for example, when it is determined that the battery remaining amount is less than the threshold (first threshold) in step ST14 as shown in FIG. 4 or step ST29 as shown in FIG. 5, the mode is shifted to the 3B/GSM fixed network mode, and then, when the beforehand set battery remaining amount further falls below the second threshold, the power of the cellular telephone apparatus 20 is turned off. The second threshold is a battery remaining amount enabling the cellular telephone apparatus 20 to be used for about ten minutes, and by turning the power off with this battery remaining amount left, it is possible to turn the power on to use the remaining time in an emergency and the like. Further, in this case, the apparatus 20 may display that the power is controlled to be off using the emitting means such as LED and the like. In this way, it is possible to get the user to recognize that the power is turned off with the predetermined remaining usage time left as the battery remaining amount decreases.

Figure 7:
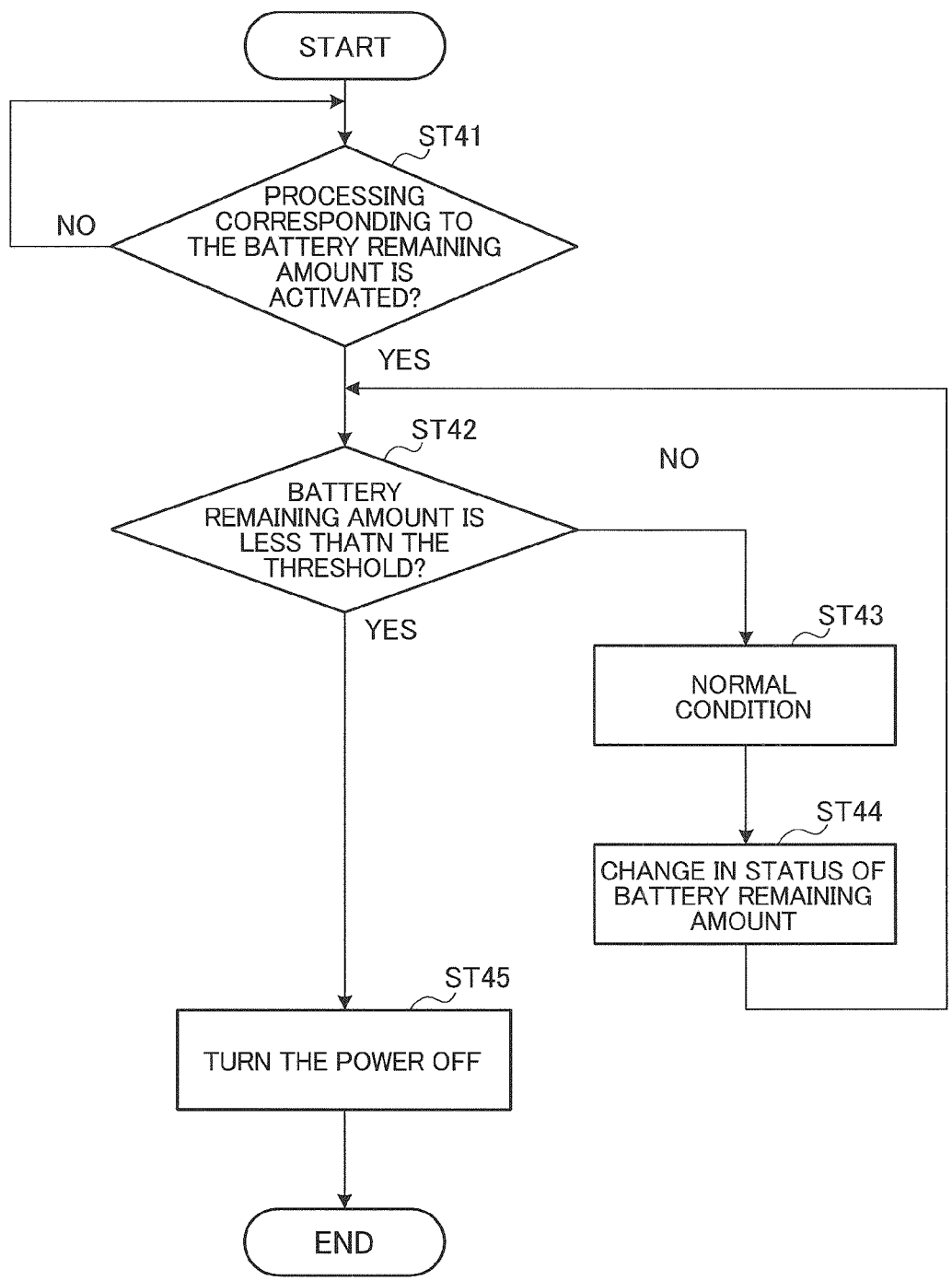
FIG. 7 is a flowchart showing a processing procedure by a control section to control the power to be off corresponding to the battery remaining amount.

In this regard, FIG. 7 is a flowchart showing a processing procedure by the control section 21 to control the power to be off corresponding to the battery remaining amount. As shown in FIG. 7, when the power of the cellular telephone apparatus 20 is turned on, the control section 21 moves into the processing procedure, and in step ST41, determines whether or not the processing corresponding to the battery remaining amount (the processing of turning the power off when the battery remaining amount falls below the threshold) is activated. The processing corresponding to the battery remaining amount can be set by operating a predetermined operating section (not shown) provided in the cellular telephone apparatus 20, and the control section 21 determines whether or not the setting is made in step ST41. Then, when the processing corresponding to the battery remaining amount is activated, the control section 21 proceeds to step ST42 from step ST41, checks the battery remaining amount of the battery mounted on the battery mount section 29 (FIG. 2), and determines whether or not the battery remaining amount is less than a beforehand set threshold (second threshold). In addition, in this Embodiment, the threshold (second threshold) in this step ST42 is assumed to be set at a value lower than the first threshold described previously in FIGS. 4 and 5.

When determining that the check result of the battery remaining amount is the threshold or more, the control section 21 proceeds to step ST43 from step ST42 to continue the processing by the normal condition. The normal condition means the processing in the case that the battery remaining amount is the second threshold or more, and as described previously in FIG. 4 or 5, the processing is to determine the automatic selection mode or fixed mode of communication systems to monitor corresponding to whether or not the battery remaining amount is more than or equal to the first threshold that is higher than the second threshold. Then, when the battery remaining amount changes (step ST44), the control section 21 returns to above-mentioned step ST42, and checks the battery remaining amount. When determining that the check result is less than the threshold, the control section 21 proceeds to step ST45 from step ST42, and controls the power of the cellular telephone apparatus 20 to be off.

Thus, when the battery remaining amount of the battery falls below the second threshold, the power of the cellular telephone apparatus 20 is controlled to be off, and it is thereby possible to secure the minimum use in an emergency and the like.

Figure 8:
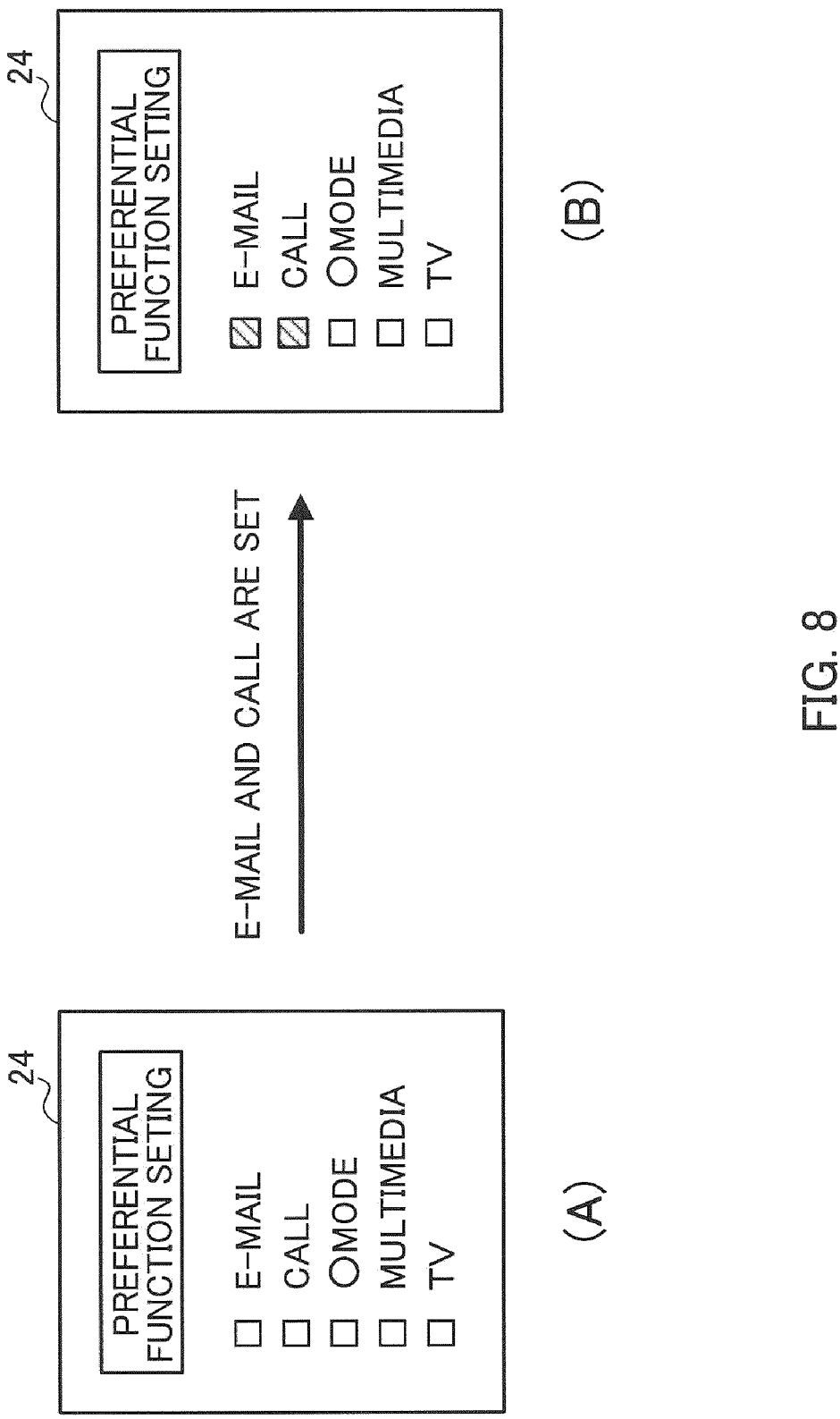
FIG. 8 is a diagram used to explain a case of setting usable functions when the battery remaining amount decreases.

Further, the above-mentioned Embodiment describes the case of fixing the communication system to monitor in a standby state to suppress power consumption when the battery remaining amount is less than a threshold (first threshold), and in addition thereto, usable functions may be limited when the battery remaining amount decreases (when the amount falls below the first threshold, or falls below the second threshold lower than the first threshold). In this case, as shown in FIG. 8, when the user beforehand assigns priorities to functions (call, e-mail and the like) to select while looking at a display of the display section 24 (FIG. 8(A)), the selection result is reflected in the display section 24 (FIG. 8(B)), and details of the setting are stored in the storing section 28. By this means, when the battery remaining amount decreases, the control section 21 enables only the functions set in the storing section 28 to be executed, and it is thereby possible to suppress power consumption.

Furthermore, the above-mentioned Embodiment describes the case of switching between the mode (3G/GSM automatic network switching mode) of automatically selecting one from two communication systems (3G system and GSM system) and the mode (3G/GSM fixed network mode) of fixing one communication system (3G system or GSM system) corresponding to the battery remaining amount, but the invention is not limited thereto. For example, when the apparatus is operable in three or more communication systems, selection targets may be limited to two communication systems or limited (fixed) to any one of the systems corresponding to the battery remaining amount, and the point is that communication systems for operations are limited corresponding to the battery remaining amount. Herein, the operations include the operation for a call, e-mail and the like, and periodical communication with an access point in the existing area (communication for monitoring and the like in the standby mode). Accordingly, by limiting the communication systems for operations, power consumption can be reduced, and as a result, it is possible to suppress exhaustion of the battery.

The present invention is not limited to the above-described Embodiments, and is capable of being carried into practice with various modifications thereof. The processing sections and/or processing procedures are capable of being carried into practice with modifications thereof as appropriate without departing from the scope of the invention.

What is claimed is:

1. A mobile terminal apparatus which is driven by a power supply from a battery, communicating with each of a plurality of communication systems, and performs monitoring of a communication environment with each of the communication systems, comprising: a detecting section that detects a battery remaining amount of the battery; and a control section operable to acquire area development information indicating development rates of the communication systems in a communication area for each telecommunication carrier providing the communications systems, and that limit targets for the monitoring based only upon the development rates when the battery remaining amount falls below a first threshold in a case where the area development information indicates developments of a plurality of communication systems, and the control section limit the targets for the monitoring to one communication system having the highest development rate when the battery remaining amount falls below the first threshold.

2. The mobile terminal apparatus according to claim 1, wherein the control section acquires information about communicable communication systems corresponding to an existing area of the mobile terminal apparatus, and based on the acquired information, selects a target for the monitoring when the battery remaining amount falls below the first threshold.

3. The mobile terminal apparatus according to claim 1, wherein the control section acquires information about communicable communication systems corresponding to an existing area by communication with at least one of the plurality of communication systems.

4. The mobile terminal apparatus according to claim 1, wherein the control section accumulates monitoring results of communication environments with the plurality of communication systems, and uses accumulated results as information about communicable communication systems corresponding to an existing area.

5. The mobile terminal apparatus according to claim 1, wherein the control section controls power of the mobile terminal apparatus to be off when the battery remaining amount of the battery falls below a second threshold lower than the first threshold.

6. The mobile terminal apparatus according to claim 1, wherein the control section limits usable functions of the mobile terminal apparatus when the battery remaining amount of the battery falls below the first threshold or a second threshold lower than the first threshold.

7. The mobile terminal apparatus according to claim 1, wherein the control section is configured to select a communication system with a high development rate based on the area development information.

8. A control method of a mobile terminal apparatus which is driven by power supply from a battery, communicating with each of a plurality of communication systems, and performs monitoring of a communication environment with each of the communication systems, comprising: detecting a battery remaining amount of the battery; acquiring area development information indicating development rates of the communication systems in a communications area for each telecommunications carrier providing the communication systems; limiting targets for the monitoring based only upon development rates when the battery remaining amount falls below a first threshold in a case where the area development information indicates developments of a plurality of communication systems; and limiting the targets for the monitoring to one communication system with the highest development rate when the battery remaining amount falls below the first threshold.

9. A communication system having a mobile communication center for communicating with a mobile terminal apparatus, wherein the mobile communication center has a transmitting/receiving section that transmits and receives signals to respond to monitoring of a communication environment performed by the mobile terminal apparatus; and the mobile terminal apparatus has a communication section communicating by a plurality of communication systems, a transmitting/receiving section that performs monitoring of the communication environment by each of the communication systems with the mobile communication center in a communication standby status, a control section to acquire area development information indicating development rates of the communication systems in a communication area for each telecommunication carrier providing the communications systems, a battery as a driving power supply, a detecting section that detects a battery remaining amount of the battery, and a limiting section that limits targets for the monitoring based only upon development rates when the battery remaining amount falls below a threshold in a case where the area development information indicates developments of a plurality of communication systems, and the control section limit the targets for the monitoring to one communication system with the highest development rate when the battery remaining amount falls below the first threshold.

* * * * *